United States Patent [19]

Siegel et al.

[11] Patent Number: 4,558,465

[45] Date of Patent: Dec. 10, 1985

[54] SWITCHED BIAS SCHEME FOR HIGH SPEED LASER TRANSMITTER

[75] Inventors: Stefan A. Siegel, East Windsor Township, Middlesex County, N.J.; David R. Patterson, Lower Makefield Township, Bucks County, Pa.; Donald J. Channin, Lawrence Township, Mercer County; Joseph B. Sergi, Jr., Cherry Hill Township, Camden County, both of N.J.; Jeffrey P. Viola, Brookhaven Borough, Pa.

[73] Assignee: RCA Corporation, Princeton, N.J.

[21] Appl. No.: 533,774

[22] Filed: Sep. 19, 1983

[51] Int. Cl.$^4$ .............................................. H04B 9/00
[52] U.S. Cl. ...................................... 455/609; 372/38; 332/7.51
[58] Field of Search ............... 370/3, 4; 455/606, 609, 455/610, 617, 618; 372/38; 332/7.51

[56] References Cited

U.S. PATENT DOCUMENTS 4,399,566 8/1983 Roullet et al. ....................... 455/618
4,412,331 10/1983 Chapman .............................. 372/38

FOREIGN PATENT DOCUMENTS 2730056 1/1979 Fed. Rep. of Germany ....... 455/618

Primary Examiner—Robert L. Griffin
Assistant Examiner—Timothy K. Greer
Attorney, Agent, or Firm—Joseph S. Tripoli; Robert L. Troike; William H. Meise

[57] ABSTRACT

In a system for transmitting two level data bursts on a fiber optic (FO) bus, a circuit for turning on a light emitting diode to an excitation level induced by a current $I_B$ corresponding to the knee of the diode characteristic curve and increasing the emitted light in response to a second increasing excitation current over a second portion of the curve beyond the knee extending from excitation level $I_B$ to excitation level $I_M$. The circuit includes first logic for exciting the diode by the first current, a light responsive device for determining when the emitted light reaches the intensity represented by the knee of the curve and induced by $I_B$, and logic for reproducibly storing $I_B$. Second logic responds to the excitation of the diode to the knee of its curve to further excite the diode with the second excitation current until the diode emits a desired light intensity induced by $I_B + I_M$. Logic is provided for reproducibly storing a signal $I_M$. Switching logic supplies the current $I_M$ to the diode in response to the data bursts and supplies $I_B$ to the diode substantially concurrently with the data bursts. In the absence of the data bursts the current level $I_B$ is reduced to substantially zero.

5 Claims, 7 Drawing Figures

SWITCHED BIAS SCHEME FOR HIGH SPEED LASER TRANSMITTER

This invention relates generally to a burst type data communication system employing a common fiber optic (FO) bus. A plurality of stations employing diode laser transmitters and receivers are coupled to the bus via a high speed switching means for rapidly switching on the diode laser at any given station and for switching the diode laser completely off when not transmitting to avoid an accumulation of a noise type residual laser light on the FO bus.

In some prior art systems employing a plurality of stations for receiving and transmitting optical signals from and to a common FO bus, each of the stations leave a residual light on the FO bus when the station is not transmitting. In these prior art systems the generating laser diode, when it is designated as being in an "off" condition, is not completely off. The accumulation of each of these residual light levels is sufficiently large to interfere significantly with the operation of the system in that it constitutes noise on the common FO bus.

The residual light level occurs as follows. When the diode laser is first excited by an excitation bias current (gradually increasing from zero value) the increase in light emission will be relatively small as the bias current is increased up to a value defined as the knee of the operating characteristic curve (or transfer curve). At this time the rate in increase of emitted laser light will increase sharply (in the steep slope portion of its operating characteristic curve) until the laser is fully turned on. In prior art devices such a biasing current is employed so that the laser is excited to the knee of its operating characteristic at all times. Consequently, when a modulating current (such as a two-level data burst signal) is superimposed on the biasing current, the laser will respond thereto to operate in the steep slope portion of its operating characteristic curve.

As noted above, however, even in the absence of a modulating data burst the biasing current remains on in prior art systems resulting in residual light levels which accumulate on the FO bus to substantially decrease signal integrity and general system performance.

It is a primary purpose of the present invention to provide circuits and logic which will turn the laser diodes completely off in the absence of a data burst signal and supply a bias current, which will be periodically updated during a refresh cycle, and which will set the operation of the laser diode at the knee of its characteristic curve immediately before and during each data burst and then completely turn off the diode at the end of each data burst.

In accordance with a preferred embodiment of the invention there is provided first control logic for exciting the laser diode by an increasing first excitation current, a light responsive device for monitoring the light emitted from the laser diode until it reaches the intensity represented by the knee of its operating characteristic curve in response to an excitation current $I_B$, and first storage logic for storing $I_B$ so that it can be reproduced. Also provided is second control logic responsive to the excitation of the diode to the knee of its operating curve to further excite the diode with an additional increasing current until the diode emits a desired light intensity in response to an excitation current $I_B+I_M$, and second storage logic for storing $I_M$ so that it can be reproduced. Switching logic supplies $I_M$ to the diode in response to the high level of the data burst signal and supplies $I_B$ to the diode immediately preceding and concurrent with the supplying of the data burst to the diode.

Figure 4:
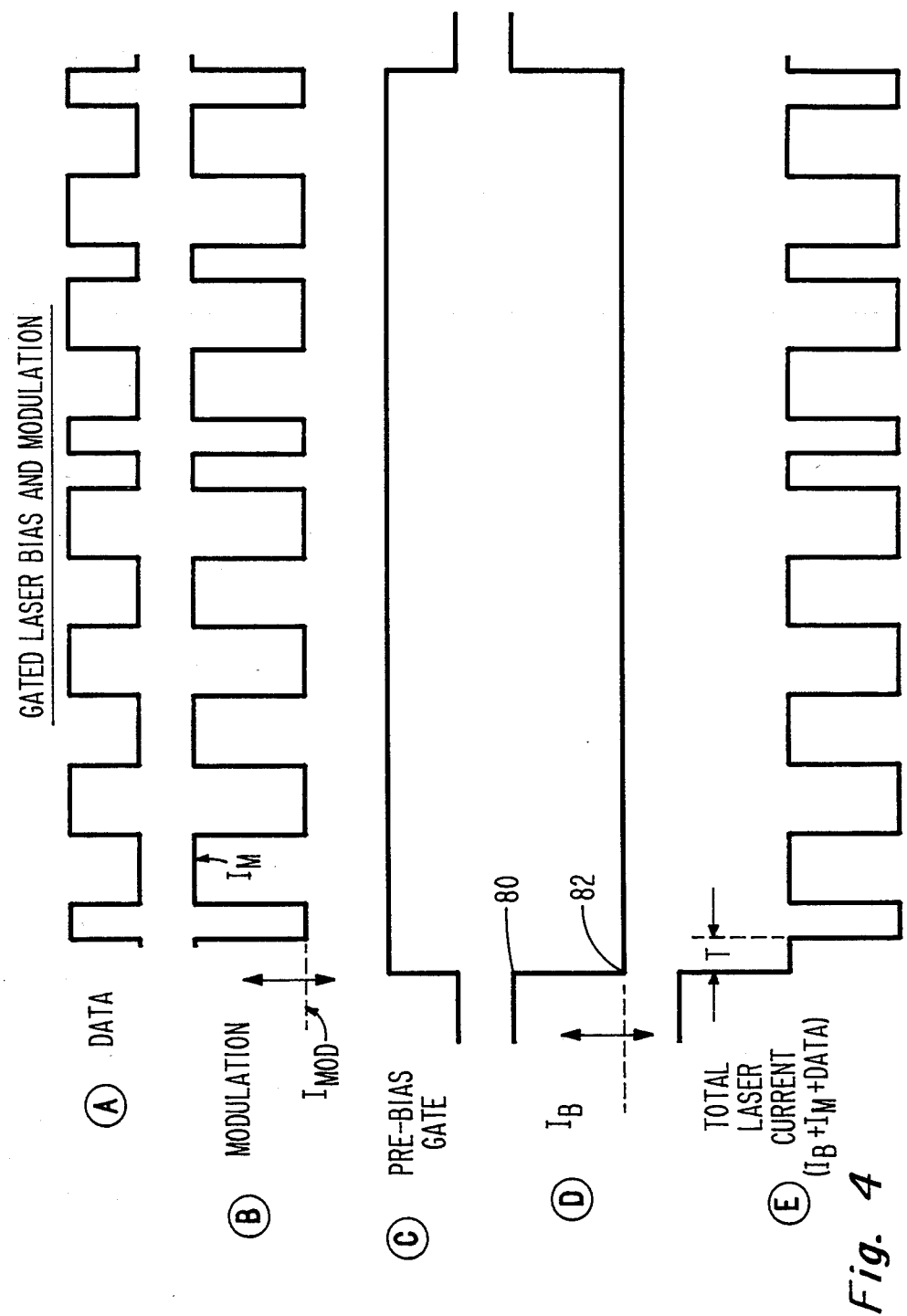
FIG. 4 is a set of waveforms showing the signals appearing at various points in the circuit of FIGS. 2 and 3.

In this specification, for purposes of brevity, the waveforms of FIG. 4 will be referred to as waveform 4A or waveform 4B rather than as waveform A of FIG. 4 or waveform B of FIG. 4.

Figure 1:
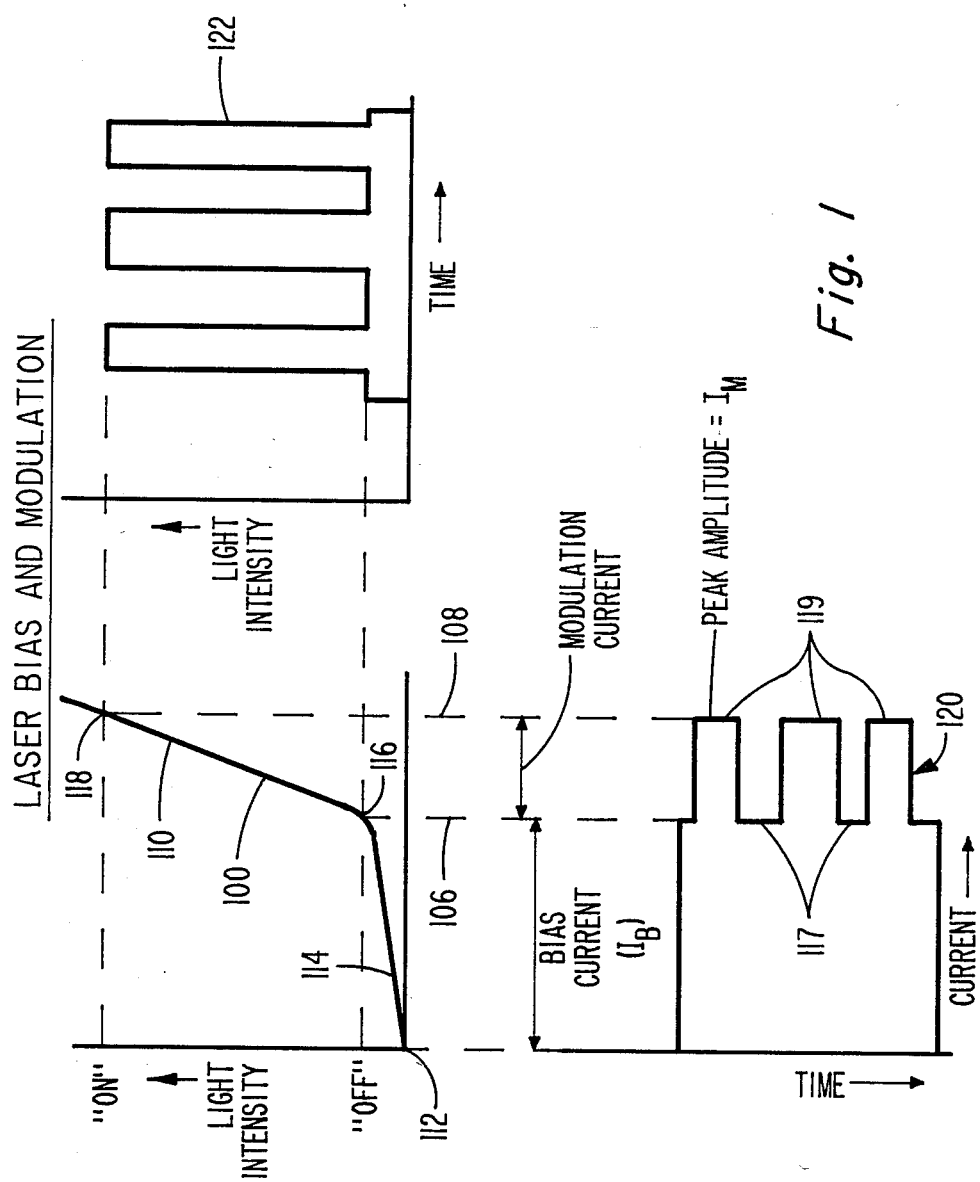
FIG. 1 shows the operating characteristic curve of a laser diode with the output signals produced thereby in response to given input signals.

Referring now to FIG. 1, the curve 100 represents the operating characteristic of the laser diode with the vertical axis representing the intensity of the emitted laser light and the horizontal axis representing the amplitude of the excitation current being supplied to the laser diode. The curve 100 has an origin point 112 where zero laser light is generated by zero excitation current, a relatively flat slope portion 114 where the slope of the curve (dL/dI) is relatively small, and a steep slope portion 110 where dL/dI is relatively large. A knee 116 marks the separation point between the relatively flat and steep slope portions 114 and 110 of curve 100.

In the operation of a laser diode it is desired that the modulated portion of the signal which carries the intelligence occur between knee 116 and the totally on condition, represented by point 118 of curve 100, which is attained by exciting the laser diode with a bias current, $I_B$, plus a modulating current $I_M$.

Figure 3:
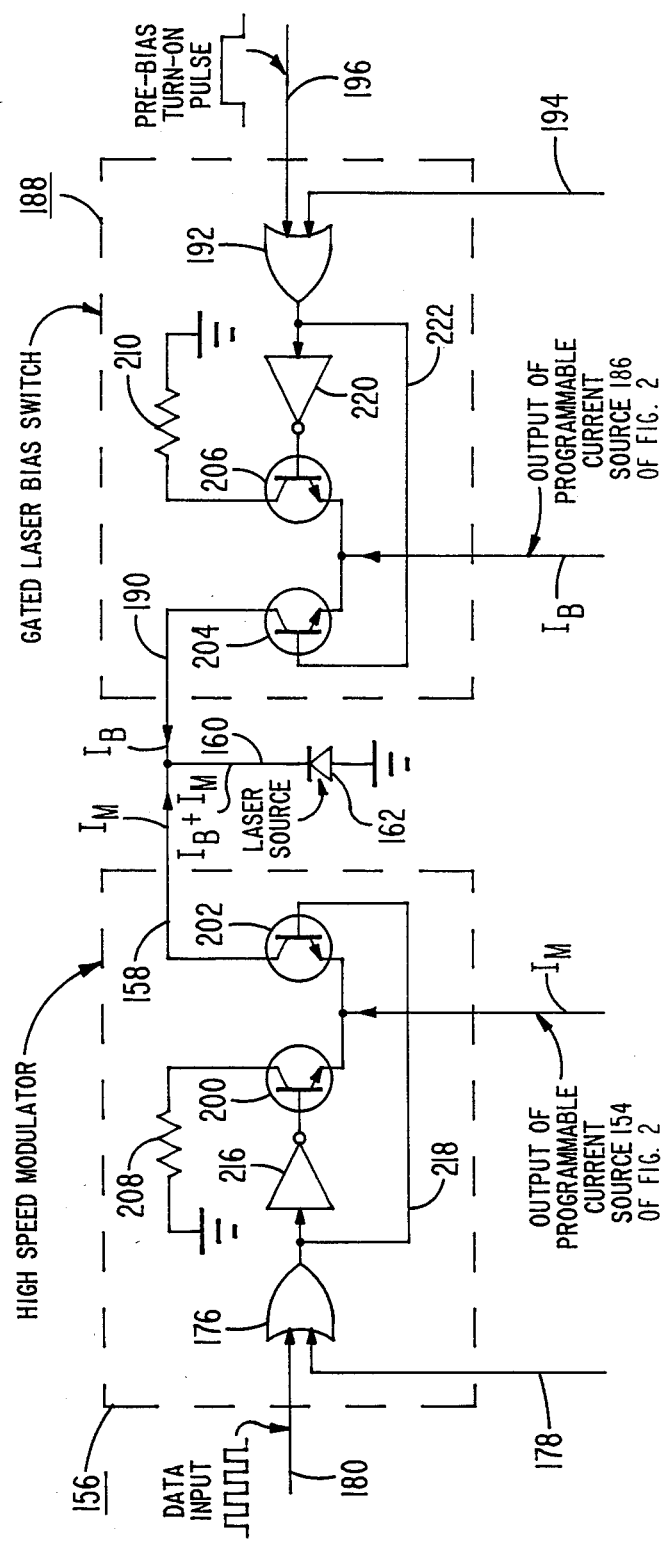
FIG. 3 is a logic and schematic diagram of suitable high speed switches which can be employed to rapidly turn a laser diode on and off and with the bias voltage thereof during the off condition returning to zero value to set the operation of the laser diode at the zero excitation level of its characteristic curve.

As will be seen later herein, the modulating current $I_M$ of FIG. 1 is supplied to the laser diode through switch 156 (FIG. 3). This switch 156 responds to a two level data burst which is supplied to input lead 180 of FIG. 3 to conduct or to not conduct $I_M$ to the laser diode via OR gate 176. The signal portion 120 of FIG. 1 represents the modulated signal $I_M$ which is supplied to laser diode 162 via switch 156. Thus, when $I_M$ is selected to excite laser diode 162 to the operating point 118 on the curve 100 of FIG. 1, the modulation swing will be between points 116 and 118 of curve 100.

The operating portion 110 of curve 100 is also defined as lying between the two vertical dotted lines 106 and 108 in FIG. 1. To obtain operation of the laser diode in the portion 110 thereof, a biasing current $I_B$ is first required to set the operation of the laser diode at the knee 116 so that a modulating current will result in the diode operating in its steep slope portion 110. A modulating current 120 with a peak amplitude $I_M$ applied to the laser diode will then produce an output light signal 122.

As mentioned above, prior art devices typically employ a constant bias current $I_B$ even in the absence of a modulating current. Thus, in the absence of such a modulating current there will be some residual laser light produced by the laser diode 162 due to $I_B$ which will appear on the FO bus and contaminate the desired light signal thereon.

In the present invention a bias current $I_B$ is supplied to the laser diode immediately before and during a data burst. At all other times such biasing current $I_B$ will have zero value so that the emitted light output of the laser diode will also be zero, as indicated at point 112 in FIG. 1, thereby preventing any of the residual light from appearing on the FO bus. The invention also provides logic for periodically refreshing the value of the bias current $I_B$ so that it will always bias the diodes at the knee 116 of their operating characteristic curves. Such refresh cycles are desirable since the operating characteristics of the diodes change with time and use, resulting in some movement of knee 116 and the slope of the steep portion 110 of the operating characteristic curve 100 of FIG. 1.

Accordingly, since it is desired to maintain the peak amplitude of the moduated output signal 122 of the laser diode at a substantially constant value it is also desirable to vary the peak of the modulation current $I_M$ from time to time during the refresh cycle. For example, if the steepness of the slope of portion 110 of the curve should increase then the value of $I_M$ should be lowered in order to maintain the modulated output signal 122 at a constant peak amplitude.

Figure 2:
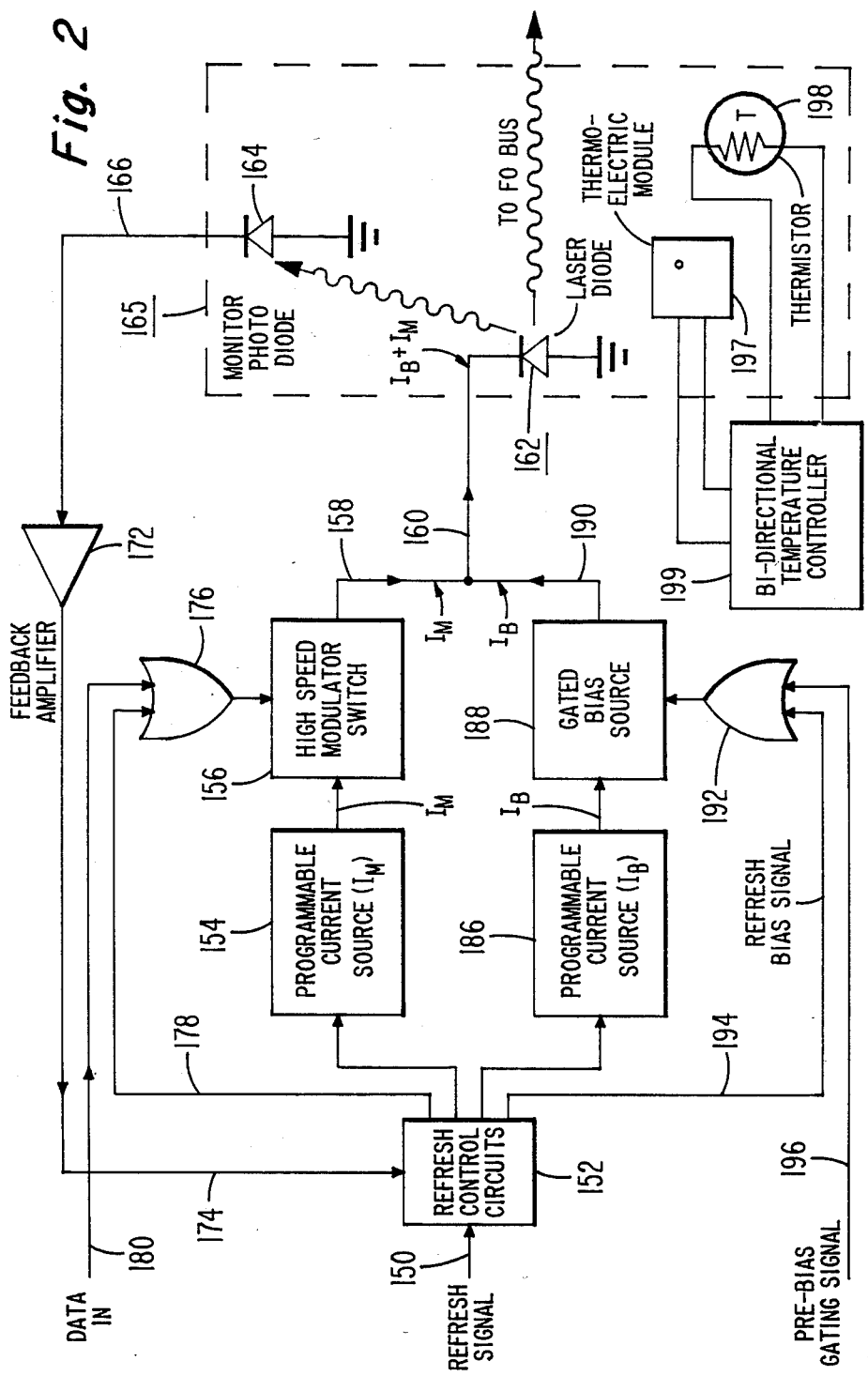
FIG. 2 is a generalized combination block and logic diagram of the invention.

Referring now to FIG. 2 there is shown a general block diagram of the logic required to perform the periodic refresh cycle in which both the bias current $I_B$ and modulation current $I_M$ are refreshed, or, renewed and then used for a period of time until the next refresh cycle occurs.

Consider now the refresh cycle and how it is implemented by the diagram of FIG. 2. A refresh signal is supplied via lead 150 from some suitable source such as a supervising central processing unit CPU, which is not specifically shown, to the refresh control circuit 152 which is shown in detail in FIG. 5 and which will be discussed later herein. For purposes of discussing the general diagram of FIG. 2, however, assume that the refresh control circuit will respond to the refresh signal to sequentially generate control signals which will first energize the laser diode 162 from a zero light emission condition gradually upward until a desired bias current $I_B$ is generated which will cause the laser diode to be operating at the knee 116 of the curve 100 of FIG. 1. More specifically, in response to the refresh signal a programmable current source 186 is first energized which functions to produce a gradually increasing current which is gated through gated bias source 188 to the laser diode 162. It is to be noted that gated bias source 188, which is in fact a switch, is caused to become conductive by a signal from refresh control circuit 152 via lead 194 and OR gate 192 at the same time that the programmable current source 186 is energized.

As the current generated in source 186 gradually increases laser diode 162 will emit light to a monitoring photo diode 164 which responds thereto to generate an electrical signal which is then supplied back to the refresh control circuit 152 via lead 166, feedback amplifier 172, and lead 174. Included in the refresh control circuit logic 152 are comparator circuits (not shown specifically in FIG. 2 but shown in FIGS. 5 and 6) which will compare the electrical signal fed back from photo responsive diode 164 with a reference voltage (also shown in FIGS. 5 and 6).

When the electrical signal supplied back through feedback amplifier 172 equals the reference voltage it indicates that the laser is operating at the knee 116 of its operating characteristic curve 100 (FIG. 1) as determined from initial calibration curves of the particular laser and photo diodes employed in the system. The refresh control circuit 152 will respond to such condition to cease the increasing of the current generated in programmable current source 186 and staticize (i.e., make constant) such current at its then existing value. The gated bias source 188, however, will continue to conduct the bias current $I_B$ from source 186 to laser diode 162.

At this point in the refresh cycle the biasing current $I_B$ has been established and it is now time to establish the modulation current $I_M$. The latter is accomplished with the use of programmable current source 154 and high speed modulator switch 156. More specifically, refresh control circuit 152 will energize current source 154 and close (make conductive) switch 156 via lead 178 and OR gate 176 and then begin to increase from zero value a current which is generated in programmable current source 154. Since $I_B$ is still being supplied to laser diode 162 the light emitted from diode 162 will continue to increase so that the signal generated by the monitor photo diode 164 will also continue to increase. Such composite signal generated by photo responsive diode 164 now consists of an electrical signal generated in response to the light generated by laser diode 162 due to both $I_B$ and $I_M$. Such electrical signal is supplied back through feedback amplifier 172 to the refresh control circuit 152.

A second comparator logic in the refresh control circuit 152 will compare this composite electrical signal with a second reference voltage and, when equality exists within certain tolerances, will cause the current $I_M$ in current source 154 to cease increasing and to become staticized at its then existing condition. The modulation current $I_M$ is shown in FIG. 1 and is seen to be superimposed upon the bias current $I_B$.

Once the values of $I_B$ and $I_M$ have been determined the refresh cycle is terminated and the system returns to normal operation. During normal operation the values of $I_B$ and $I_M$ are retained in programmable current sources 186 and 154, respectively. However, the two switches 188 and 156 remain open circuited (non-conductive) until a data burst occurs so that neither $I_B$ or $I_M$ are supplied to the laser diode 162 until such data burst occurs. In other words, the laser diode is completely off during the absence of the data burst during normal operation and in fact, is operating at substantially point 112 of FIG. 1. When a data burst occurs, however, a pre-biasing gating signal (waveform 4C) is supplied via lead 196 through OR gate 192 to switch 188 immediately before such data burst to permit $I_B$ (waveform 4D) to flow from current source 186 to laser diode 162. Thus, laser diode 162 is now operating at the knee 116 of its operating characteristic, as shown in FIG. 1. The data burst (waveform 4A) follows immediately thereafter and is supplied via lead 180 (FIG. 2) through OR gate 176 and high speed switch 156 to the laser diode 162 as shown in waveform 4B.

During the high level portions of the data, as represented by levels 119 of FIG. 1, switch 156 is closed (conductive) to permit the current $I_M$ generated in source 154 to be supplied to laser diode 162. During the low level portions of the data such as levels 117 of FIG. 1, the switch 156 is open circuited to prevent the flow of $I_M$ from source 154 to laser diode 162. The output of laser diode 162 is the laser signal 122 (FIG. 1) which is supplied to the FO bus (not shown in FIG. 1).

It is to be noted that photo diode 164 (FIG. 2) is effectively out of the circuit during the normal mode of operation in that the refresh control circuit 152 will ignore any signals outputted from feedback amplifier 172. In fact, the refresh control circuit 152 is also removed from the system during normal operation. Only the current sources 154 and 186, switches 156 and 188, and OR gates 176 and 192 are employed during normal operation.

To control the temperature environment of laser diode 162 there is provided logic including a thermoelectric module 197, a thermistor 198, and a bi-directional temperature control logic 199, which operate together in a well known manner.

FIG. 3 shows combination schematic and logic diagrams of the high speed modulator switch 156 and the high speed gated bias source switch 188 shown as blocks 156 and 188 of FIG. 2. More specifically, gated bias source 188 of FIG. 2 is represented by the emitter coupled arrangement of transistors 204 and 206 within dotted block 188 of FIG. 3 and high speed modulator switch 156 of FIG. 2 is represented by a similar emitter coupled arrangement of two transistors 200 and 202 within dotted block 156 of FIG. 3.

Consider first the switch within block 188. When either the pre-bias turn-on pulse (waveform 4C) or the refresh bias signal via lead 194 (FIG. 2) from refresh control circuit 152 is supplied through OR gate 192 and inverter 220 to the base of transistor 206, such transistor 206 is caused to be non-conductive. On the other hand, the non-inverted input signal gate 192 is supplied directly from the output of OR gate 192 to the base of transistor 204 which becomes highly conductive very quickly, aided greatly by the turning off of transistor 206. The current through the highly conductive transistor 204 is determined by the value of current $I_B$ from programmable current source 186 of FIG. 2. Such current $I_B$ also flows through laser source diode 162 which responds thereto to generate the laser light. The intensity of the laser light at this point is dependent upon the amount of current $I_B$ flowing through transistor 204. As discussed above, the value of $I_B$ is determined during the refresh cycle and later is supplied through switch 188 immediately before the reception of a data pulse which is supplied to the high speed modulator switch 156 via input lead 180.

It should be noted that the pre-bias turn-on pulse supplied to one input of OR gate 192 via lead 196, which is the pre-bias gating signal of waveform 4C supplied to lead 196 of FIG. 2, must precede, by some small time interval, the supplying of data to input lead 180 since switch 188 must be closed before $I_B$ from source 186 can pass therethrough to laser diode 162 and, further, since $I_B$ must precede the data burst.

The high speed modulator switch within block 156 functions generally in the same manner as the switch within block 188. The modulation current $I_M$ supplied to the emitters of transistors 200 and 202 will flow almost entirely through transistor 202 when the high level portions of a data burst are supplied through OR gate 176 to enable transistor 202 and disable transistor 200. When data is supplied via lead 180 through OR gate 176 and inverter 216, transistor 200 will become non-conductive during the high level portions of said data. At the same time, transistor 202 will become highly conductive because the uninverted data input is supplied via lead 218 to the base of transistor 202. The current flow through the now highly conductive transistor 202 is determined by the value of the modulating current $I_M$ which was determined during the refresh period as discussed above in connection with FIG. 2. During the low level portions of data input, transistor 202 will be non-conductive so that the current flowing through laser source 162 due to the action of switch 156 will be negligible. As discussed above, the only current through laser 162 during such low level portions will be $I_B$ which is made possible by the presence of the pre-bias turn-on pulse supplied via lead 196.

The gating signals appearing on leads 194 and 178 during the refresh cycle and supplied to OR gates 192 and 176 are generated within the refresh control circuit 152 of FIG. 2 is a manner which will now be described in more detail in connection with the discussion of FIG. 5.

Figure 5:
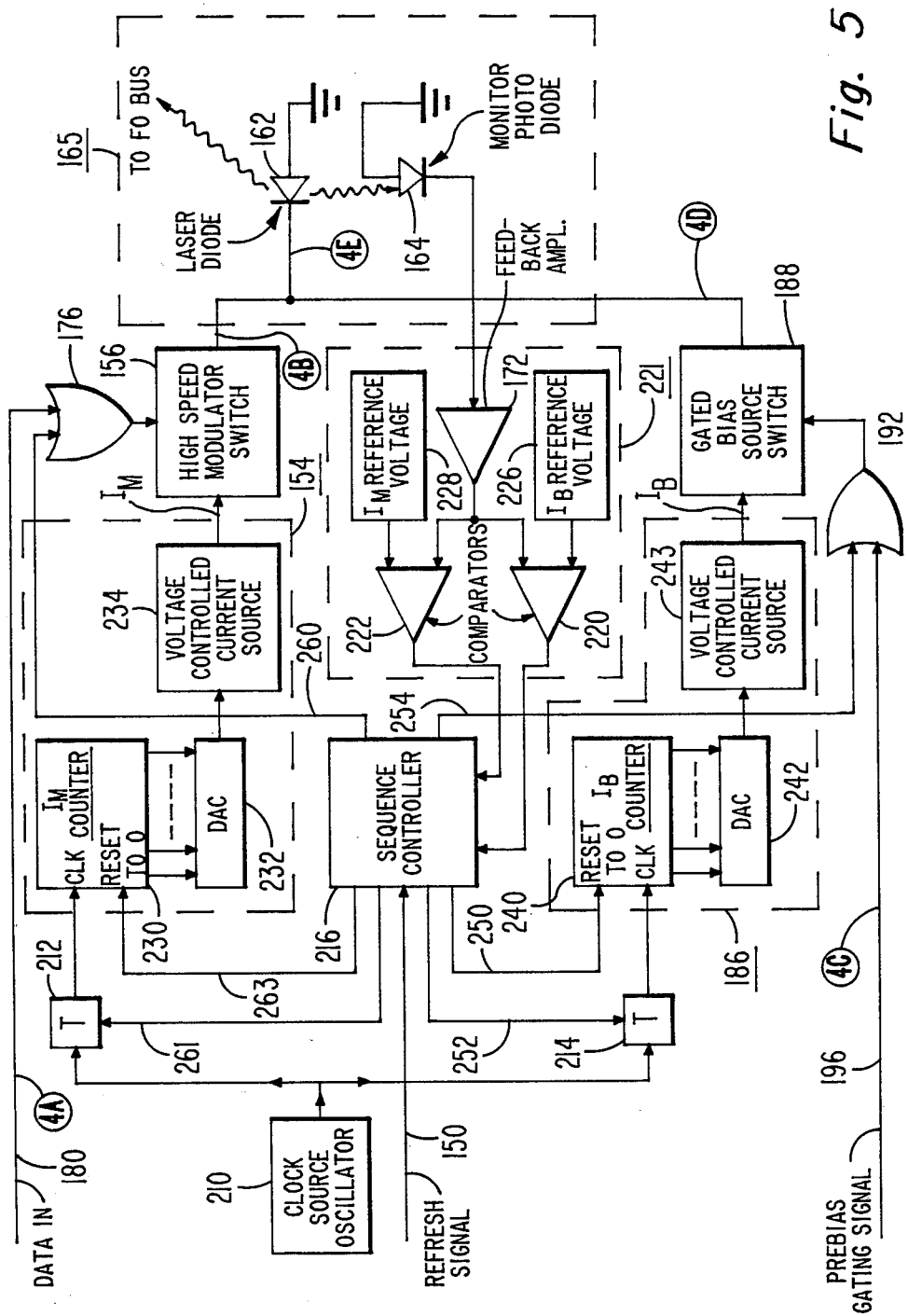
FIG. 5 is a more detailed logic and block diagram of the control circuits employed to perform the timing of the refresh cycle mode and also the normal operating mode of the circuit.

In FIG. 5 there is shown a more detailed combination block and schematic diagram of the invention than is shown in FIG. 2. Many of the elements in FIG. 5 correspond to elements shown in FIG. 2 and are identified by the same reference characters. More specifically, the detailed logic within dotted blocks 154 and 186 of FIG. 5 correspond to blocks 154 and 186 of FIG. 2. OR gates 176 and 192, high speed modulator switch 156, and gated bias source switch 188 of FIG. 5 correspond to similarly identified elements of FIG. 2. The logic within block 165 of FIG. 5 corresponds to the logic within block 165 of FIG. 2 except that the temperature controlling elements 197, 198 and 199 shown in FIG. 2 are not shown in FIG. 5. Feedback amplifier 172 of FIG. 5 corresponds to feedback amplifier 172 of FIG. 2.

The remaining elements of FIG. 5 represent an expanded representation of the refresh control circuit 152 of FIG. 2. More specifically, these expanded elements include clock source 210, transmission gates 212 and 214, comparators 220 and 222, and $I_B$ and $I_M$ reference voltage sources 226 and 228.

Counter 230, digital-to-analog (DAC) 232, and voltage controlled current source 234 comprise a somewhat more detailed showing of the programmable current source 154 of FIG. 2. Similarly, counter 240, DAC 242, and voltage controlled current source 243 constitute a more detailed showing of the programmable current source 186 of FIG. 2.

The various signals represented by the waveforms of FIG. 4 appear at various points in the circuit of FIG. 5, as represented by the encircled letters on FIG. 5. For example, waveform 4A, which is the data input, appears on the input lead 180 of FIG. 5, as indicated by the encircled 4A pointing to input lead 180.

Figure 6:
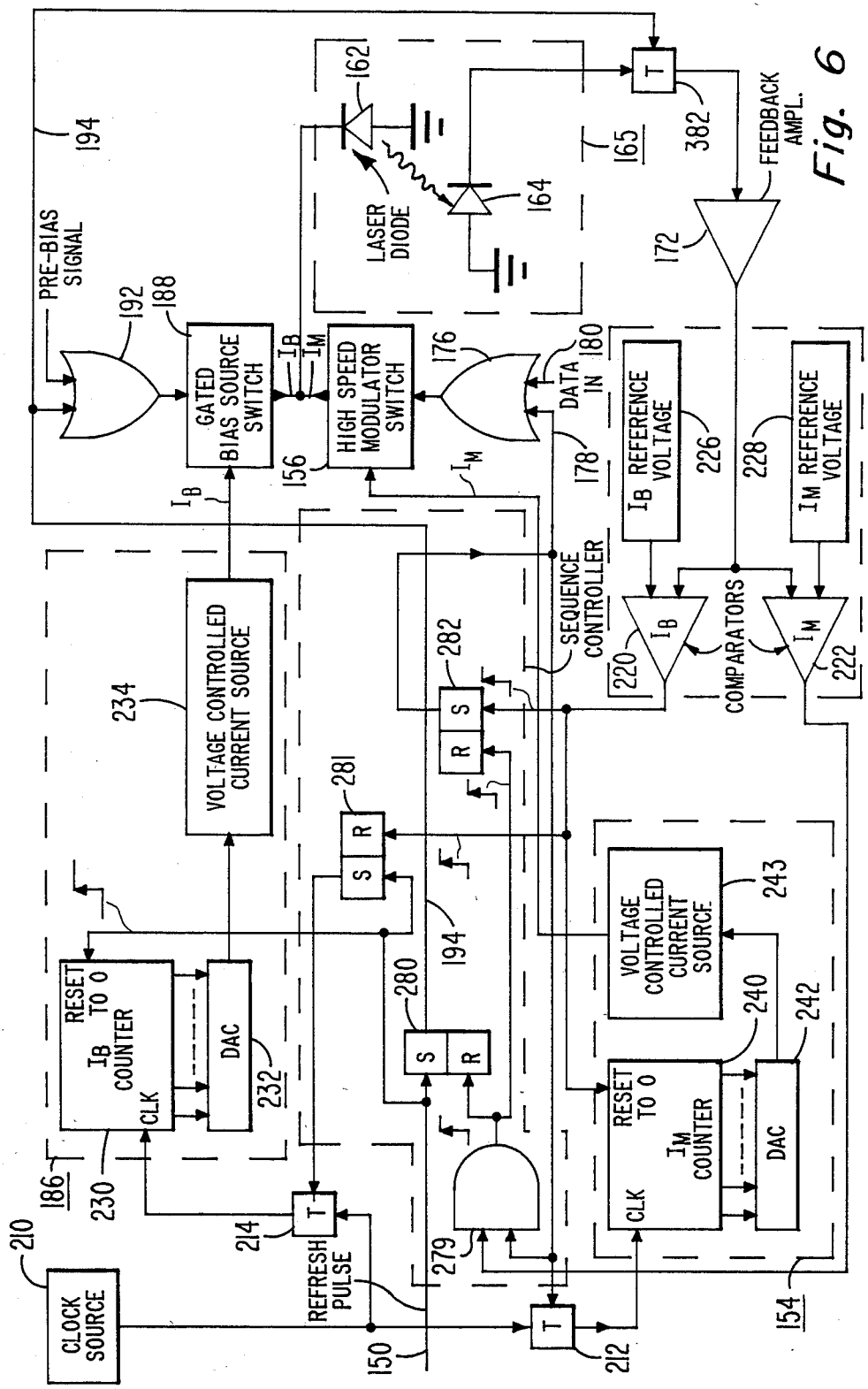
FIG. 6 is a detailed logic and block diagram of the sequence controller logic 216 of FIG. 5.

Sequence controller 216 of FIG. 5 controls the timing in the two modes of operation of the system, namely the refresh cycle mode and the normal mode. A more detailed showing of sequence controller 216 is shown in FIG. 6 and will be discussed later herein. For purposes of the discussion of FIG. 5 the generation of certain timing signals will be assumed.

In the refresh cycle the $I_B$ counter 240 will first be reset to zero by an output signal from sequence controller 216 via lead 250. Immediately thereafter transmission gate 214 will be energized by an output signal from controller 216 via lead 252 to supply the output of oscillator 210 through transmission gate 214 to $I_B$ counter 240. Such counter 240 will count in response to the output signal from oscillator 210 and concurrently generate an increasing analog voltage at the output of DAC 242 which is supplied to voltage control current source 243 which in turn generates the current $I_B$.

Gated bias source switch 188 of FIG. 5 becomes conductive simultaneously with the resetting of $I_B$ counter 240 to zero by a signal supplied from controller 216 via output lead 254 and OR gate 192. Thus, the current $I_B$ generated in current source 243 is supplied to laser diode 162 which will respond thereto to generate a laser light whose intensity is proportional to the magnitude of $I_B$. As discussed above, monitoring photo diode 164 detects a certain percentage of this laser light and supplies it back through feedback amplifier 172 to a pair of comparators 220 and 222. By control means in controller 216 only the output signal of comparator 220 will be used by the system during the time that the value of $I_B$ is being determined. When the signal supplied from feedback amplifier 172 is equal to the $I_B$ reference voltage 226, the comparator 220 will output a signal to sequence controller 216 indicating that the feedback signal has become equal to reference voltage 226 and that it is now time to establish the value of the modulating current $I_M$. The sequence controller inhibits the further incrementing of $I_B$ counter 240 by supplying a control signal via lead 252 to inhibit transmission gate 214, thereby storing the then current value of $I_B$ in counter 240.

Controller 216 further responds to the output of comparator 222 after disabling transmission gate 214 to enable transmission gate 212 via lead 261, thereby allowing the output of clock source 210 to pass to the clock input of $I_M$ counter 230 which has been reset to zero via lead 263 immediately prior thereto by control means within controller 216 in a manner to be discussed later herein in connection with FIG. 6.

In summary, at the same time that transmission gate 212 becomes energized and transmission gate 214 becomes disabled, the sequence controller 216 will cause the output of comparator 220, which is associated with $I_B$, to be disabled and comparator 222, which is associated with $I_M$, to be enabled.

Thus, the circuit will be comparing the output of the monitor photo diode 164 and feedback amplifier 172 with the $I_M$ reference voltage 228 to establish the range of modulation amplitude of the output signal of laser diode 162.

As the count in $I_M$ counter 230 increases a corresponding increasing analog voltage will be generated in DAC 232. Such analog voltage will be supplied to voltage controlled current source 234.

Immediately before the supplying of the clock signal to $I_M$ counter 230 the high speed modulator switch 156 was made continuously conductive by a signal supplied thereto from controller 216 via lead 260 and OR gate 176. The output $I_M$ of high speed modulator switch 156 is a signal whose amplitude determines the maximum value of any data subsequently outputted from the system (i.e., from laser diode 162) as represented by waveform 4E. In other words, the value of $I_M$ is set under steady state or continuous wave (CW) conditions thereby establishing the peak modulation current supplied to laser diode 162. It is to be noted that $I_B$ supplied from voltage controlled current source 243 is concurrently supplied to laser diode 162.

Referring now to FIG. 6 there is shown a more detailed diagram of the sequence controller 216 of FIG. 5. Many of the elements shown in FIG. 6 correspond to elements in FIG. 5 and are identified by the same reference characters. Thus, the logic within blocks 186, 154, 221 and 165 of FIG. 6 correspond to logic within similarly identified blocks of FIG. 5. The switches 156 and 188 of FIG. 6 correspond to switches 156 and 188 of FIG. 5. OR gates 192 and 176 and transmission gates 212 and 214 of FIG. 6 also have corresponding elements in FIG. 5.

The remaining elements of FIG. 6 comprise the elements of sequence controller 216 of FIG. 5, and specifically include flip-flops 280, 281, and 282, and AND gate 279.

A refresh cycle initiating pulse is supplied via lead 150 to the set inputs of flip-flops 280 and 281 to set flip-flops 280 and 281 and to the reset-to-zero input of counter 230. The set output of flip-flop 280 then functions to enable (make conductive) switch 188 through OR gate 192 and to enable transmission gate 382 via lead 194.

The setting of flip-flop 281 enables transmission gate 214 to allow the output of clock source 210 to clock $I_B$ counter 230 (which has just been reset to zero by the leading edge of the refresh pulse on lead 150). As counter 230 increases its count the output of DAC 232 is also increased to control the magnitude of the current generated in voltage controlled current source 234, as discussed above. The output of source 234 passes through switch 188 to laser diode 162.

Also, as discussed above, the photo diode monitor 164 will pick up a portion of the radiated light from diode 162 which will then be passed, as an electrical signal, through enabled transmission gate 382, and feedback amplifier 172, to comparator 220. The output of comparator 222 is not important at this time since it is supplied to one input of AND gate 279 which is disabled by the initial reset condition of flip-flop 282.

When the bias current $I_B$ reaches its desired value, as determined by comparator 220 and the $I_B$ reference voltage 226, the comparator 220 will change states to set flip-flop 282, to reset flip-flop 281 and to reset $I_M$ counter 240 to zero in preparation for the determination of the value of $I_M$. The setting of flip-flop 282 will close (make conductive) switch 156 through OR gate 176 and will enable transmission gate 212 so that $I_M$ counter 240 will begin to count (from 0). The resetting of flip-flop 281 will disable transmission gate 214 to staticize the then current count in $I_B$ counter 230.

As counter 240 counts up from zero it will generate an analog voltage at the output of DAC 242 which will be supplied to voltage controlled current source 243. Source 243 will respond to such voltage from DAC 242 to generate a current $I_M$ which will be supplied through switch 156 (when conductive) to laser diode 162.

As soon as transmission gate 212 is enabled, which occurs at the same time transmission gate 214 is disabled, comparator 222 will also become active in the logic since the count in $I_M$ counter 240 will be increasing, thus increasing $I_M$. As $I_M$ increases the signal fed back from monitor diode 164 through feedback amplifier 172 will also increase until it equals the $I_M$ reference voltage 228. At this time, the output of comparator 222 will change states to supply a leading edge signal through AND gate 279 (primed when flip-flop 282 became set by the output from comparator 220) to reset flip-flop 280 and flip-flop 282.

The resetting of flip-flop 282 removes the energizing signal from lead 159 for switch 156 so that switch 156 can respond to data when normal operation resumes. The resetting of flip-flop 280 removes the energizing signal for switch 188 from lead 194 (via OR gate 192) so that switch 188 can respond to pre-bias signals during normal operation.

The refresh cycle mode is now ended, leaving the system in condition for normal operation and for the reception of the next refresh cycle at a later time.

It should be noted that when flip-flops 280 and 282 are reset the contents of both counters 230 and 240 remain staticized so that the values of $I_B$ and $I_M$ as determined during the refresh cycle will be supplied to laser diode 162 during normal operation until the next refresh cycle occurs.

Figure 7:
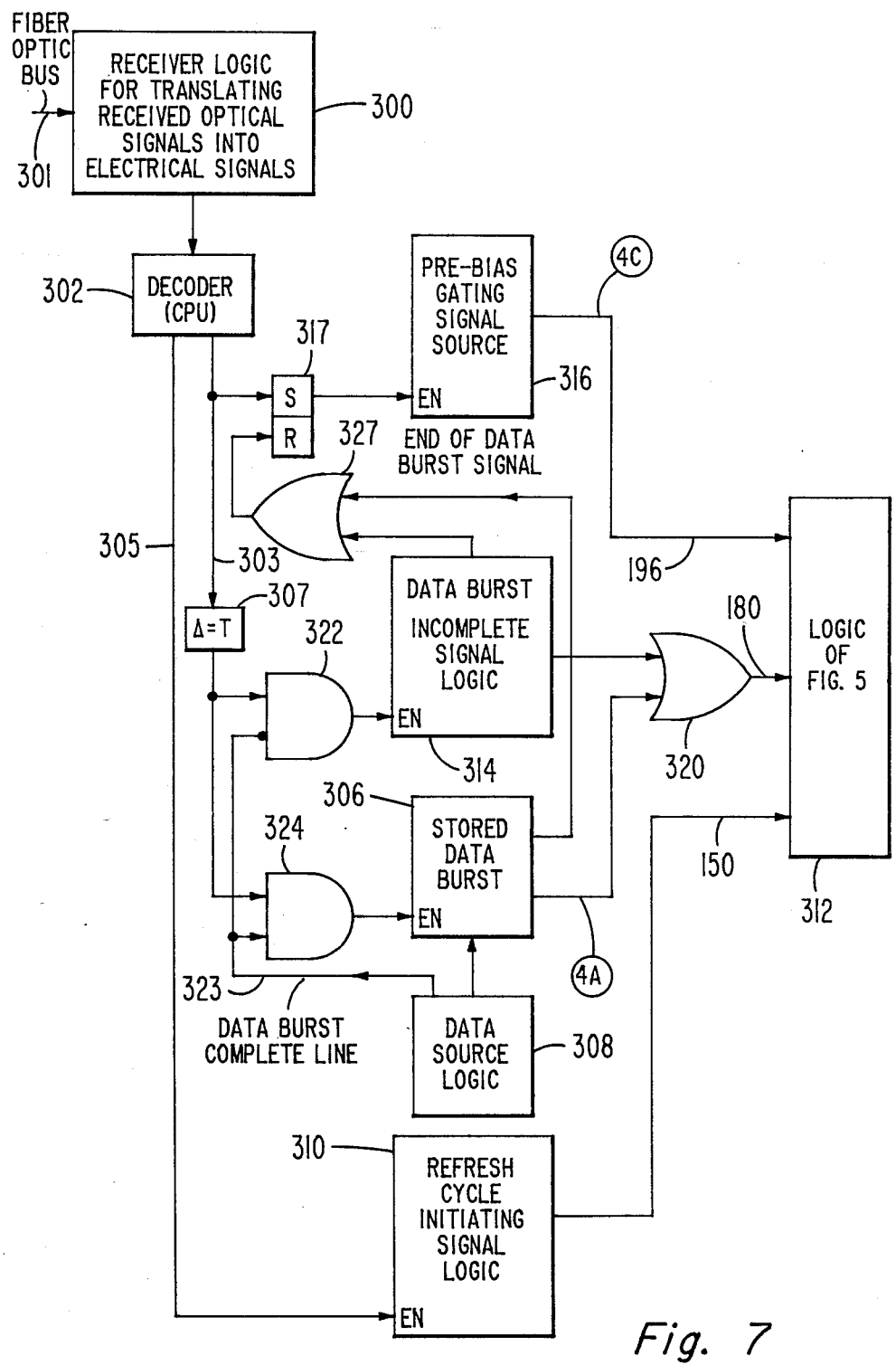
FIG. 7 is a block diagram of the overall system.

Referring now to FIG. 7, there is shown structure for initiating and terminating the pre-bias gating signal, the data burst, and the refresh cycle initiating signal which are employed as inputs to the structure of FIG. 5.

The structure of FIG. 5 is basically the transmitting portion of a station which is one of many such stations on the common FO bus. Not shown in FIG. 5, but shown in FIG. 7, is the logic located at a station for receiving a signal transmitted thereto on the FO bus. Such a signal can originate at any of the stations on the FO bus including a supervisory station which can control the occurrence of refresh signals. Also, each station can receive instructions directed thereto on the FO bus and decode such instructions via appropriate decoder means, which can be a central processing unit (CPU). Data bursts are generated in response to such received signals instructions or, alternatively, can originate at a given station. These data bursts are normally formed as electrical signals and are supplied to an input lead such as lead 180 of FIG. 5.

As discussed above, a pre-bias gating signal should occur immediately prior to a data burst and supplied to a lead such as lead 196 of FIG. 5. Also a refresh cycle signal must be generated periodically and supplied to a lead such as lead 150 of FIG. 5.

All of the foregoing signals can be generated by the general logic of FIG. 7. Assume that a coded instruction is received by receiver 300 (located at the station of FIG. 5) via FO bus 301 of FIG. 7. Receiver 300 will translate such received optical signals into electrical signals and supply them to decoder 302. The output of decoder 302 functions to either initiate transmission of data bursts via output lead 303 and AND gates 322 or 324 along with a pre-bias gating signal by setting flip-flop 317 or to initiate a refresh signal via lead 305, depending upon the nature of the received instruction.

If the transmission of a data burst is to be initiated, an enabling signal is supplied via delay 307 AND gate 324 (when primed) to the stored data burst block 306 which, if it contains a complete data burst, will supply such data burst through OR gate 320 to input 180 of the structure of FIG. 5. The priming of AND gate 324 is effected by a high level signal supplied to AND gate 324 from data source logic 308 via data-burst-complete indicating lead 323.

If a complete data burst has not been supplied to stored data burst logic 306 from data source 308, the data-burst-complete indicating output lead 323 will be at a low level, thereby disabling AND gate 324 and enabling inhibit AND gate 322, which in turn will enable logic 314 to supply the data-burst-incomplete signal through OR gate 320 to the logic of FIG. 5, and indicating that the station of FIG. 5 is not ready to transmit a complete data burst.

During the supplying of a complete data burst from storage logic 306 or the incomplete data-burst-indicating signal from logic 314 through OR gate 320, pre-bias gating source 316 is enabled by the set condition of flip-flop 317 to supply the appropriate undelayed pre-bias gating signal to lead 196. The pre-bias gating signal will begin immediately prior to the data burst (or the incomplete data burst signal), by the delay time $\Delta = T$, and will terminate immediately thereafter by a data burst completion signal which is supplied from either data burst source logic 306 or data burst incomplete logic 314 through OR gate 327 to reset flip-flop 317.

At periodic intervals, receiver 300 at the station shown in FIG. 7 will receive an instruction from a supervisory station (not shown) indicating that a refresh signal is to occur. Decoder logic 302 will respond to such instruction to supply a signal via lead 305 to block 310 which in turn will generate a refresh cycle initiating signal as discussed above with respect to FIGS. 5 and 6.

What is claimed is:

1. In a system for receiving and transmitting light encoded data bursts on a fiber optic data bus, a method for switching to an on condition a light emitting diode having an operating characteristic curve with a low rate of increase of emitted light intensity over a first portion thereof extending from zero excitation level to a first excitation level induced by a bias current $I_B$ and a high rate of increase of emitted light intensity with additional increasing excitation over a second portion thereof extending from the first excitation level to a second excitation level induced by a sum current $I_B + I_M$ equal to the sum of said bias current $I_B$ and a modulating current $I_M$ and comprising the steps of:

progessively exciting said diode from a substantially zero excitation level to said first excitation level induced by $I_B$;

progressively exciting said diode from said first excitation level to said second excitation level resulting from an excitation current gradually increasing from $I_B$ to $I_B + I_M$;

reproducibly storing $I_B$ and $I_M$;

generating a series to two level electrical data burst signals;

supplying $I_B$ to said diode immediately preceding and during the generation of said series of two level electrical data burst signals;

terminating the supply of $I_B$ to said diode at the end of the generation of each two level electrical data burst signal to return the excitation of said laser diode to zero; and supplying $I_M$ to said diode in response to the high level portions of said electrical two-level data burst signals while supplying $I_B$ to said diode.

2. A circuit for rapidly turning on a light emitting diode having an operating characteristic curve with a low rate of emitted light intensity over a first portion thereof extending from zero excitation level to an excitation level induced by a current $I_B$ and a high rate of increase of emitted light intensity with additional increasing excitation over a second portion thereof extending from the excitation level induced by $I_B$ to an excitation level induced by a current $I_B + I_M$, with a knee of the curve separating said first portion from said second portion comprising:

first and second logic means for performing, respectively, a refresh mode of operation for establishing the required values of $I_B$ and $I_M$, and a normal mode of operation for operating the system during the reception and transmission of data bursts;

said first logic means operative in said refresh mode of operation and comprising first excitation means coupled to said light emitting diode for gradually exciting said diode from its zero excitation level to said knee of its operating characteristic curve by a first excitation current which gradually increases from a zero value to a value $I_B$, first memory means coupled to said first excitation means for reproducibly storing information allowing reproduction of said current value $I_B$, second excitation means coupled to said light emitting diode for exciting said light emitting diode from said knee of its operating characteristic to a second excitation level at a predetermined point on said second portion of its operating characteristic curve by a second excitation current increasing gradually from said current value $I_B$ to a current value $I_B$ plus $I_M$, and second memory means coupled to said second excitation means for reproducibly storing information allowing reproduction of said current value $I_M$;

second logic means operative in said normal mode of operation and comprising data source means for generating a series of logic HIGH and LOW level electrical data burst signals, gating signal generating means coupled to said data source means for generating a gating signal beginning immediately before and terminating substantially concurrently with each burst of said data burst signals, and switching means coupled to said first excitation means, said second excitation means, said data source means and said gating signal generating means and responsive to said gating signal and to said HIGH levels of said data burst signal to supply to said light emitting diode current having said value $I_B$ plus $I_M$ to said diode.

3. A circuit as in claim 2 in which said switching means comprises first switch means serially coupled with said first excitation means and coupled to said gating signal generating means and to said light emitting diode and responsive to said gating signal to supply said current value $I_B$ to said light emitting diode, and second switch means serially coupled with said second excitation means and coupled to said gating signal generating means, to said data source means and to said light emitting diode and responsive to said gating signal and to said HIGH level of said data burst signals to supply current having said value $I_M$ to said light emitting diode.

4. A circuit as in claim 2 in which: said first logic means further comprises refresh signal generating means for periodically generating a refresh signal indicating the initiation of the refresh mode of operation; and in which said first excitation means comprises first current generating means responsive to said refresh signal to generate said first excitation current which is supplied to said diode to excite said diode to emit light, and light detecting means responsive to the light emitted from said diode to generate an intensity signal indicative of the intensity of the light emitted from said diode, and first comparator means responsive to said intensity signal and to a predetermined first reference signal level to indicate when said first excitation current has attained said current value $I_B$, said second excitation means includes second current generating means responsive to the attainment of said current value $I_B$ to generate said second increasing excitation current which is supplied to said diode, in addition to $I_B$, to excite said diode to emit additional light, and said second excitation means further includes second comparator means responsive to said intensity signal and to a predetermined second reference signal level to indicate when said second excitation current has attained said current $I_M$.

5. A circuit for turning on a laser diode whose operating characteristic curve has a low rate of increase of emitted light with increasing current drive over a first portion thereof extending from zero current drive level to a current drive level established by a particular bias current and a high rate of increase of emitted light with additional increasing current drive over a second portion of said operating characteristic curve extending from the current drive level established by said particular bias current to a peak current drive level produced by the sum of said particular bias current and a peak modulating current, with a knee in said operating characteristic curve separating said first and second portions comprising:

a controllable bias current source;

a bias current switch coupled to said bias current source and to said laser diode for controllably coupling said bias current from said bias current source to said laser diode;

light sensing means optically coupled to said laser diode for generating a light representative signal representative of the light intensity produced by said laser diode;

first comparator means coupled to said light sensing means for comparing said light representative signal with a signal representative of the light produced by said laser diode when operating at said particular bias current for generating a first control signal;

a controllable modulating current source;

a modulating current switch coupled to said modulating current source and to said laser diode for controllably coupling said modulating current from said modulating current source to said laser diode;

second comparator means coupled to said light sensing means for comparing said light representative signal with a signal representative of the light produced by said laser diode when operating at said peak current drive level for generating a second control signal;

first control means coupled to said bias current source, to said bias current switch and to said first comparator means for, in a refresh mode of operation; closing said bias current switch and for causing said bias current to increase and to stop increasing at said particular bias current value established by said first control signal;

second control means coupled to said modulating current source, to said modulating current switch and to said first and second comparator means for, in said refresh mode of operation, closing said modulating current switch and for causing said modulating current to increase at a time established in response to said first control signal, and for causing said modulating current to stop increasing at said peak current drive level established by said second control signal whereby said modulating current source produces said peak modulating current;

data source means for generating data bursts each consisting of a pattern of logic HIGH and logic LOW level signals;

pre-bias control signal generating means coupled to said data source means for generating a pre-bias control signal initiated immediately preceding each said data burst and terminated immediately following each said data burst; and third control means coupled to said data source means, to said pre-bias control signal generating means, to said bias current switch and to said modulating current switch for, in a normal mode of operation, responding to said pre-bias control signal and to said logic LOW level signals to close said bias current switch for supplying said particular bias current value to said laser diode, and responding to said pre-bias control signal and to said logic HIGH level signals to close both said bias current switch and said modulating current switch to supply to said laser diode said sum of said particular bias current and said peak modulating current.

* * * * *